United States Patent [19]
Zuideveld et al.

[11] Patent Number: 4,900,340
[45] Date of Patent: Feb. 13, 1990

[54] CONTACTING DEVICE FOR GAS AND SOLID PARTICLES

[75] Inventors: Pieter L. Zuideveld; Michiel J. Groeneveld, both of Amsterdam, Netherlands

[73] Assignee: Shell Oil Company, Houston, Tex.

[21] Appl. No.: 200,157

[22] Filed: May 31, 1988

[30] Foreign Application Priority Data

Jun. 5, 1987 [NL] Netherlands .......................... 8701320

[51] Int. Cl.⁴ ............................................. B01D 53/04
[52] U.S. Cl. .......................................... 55/208; 55/73; 55/74; 55/267; 55/387
[58] Field of Search .................... 55/208, 68, 73, 74, 55/387, 267

[56] References Cited

U.S. PATENT DOCUMENTS

| 3,264,803 | 8/1966 | Read ........................ 55/208 |
| 3,296,773 | 1/1967 | Hemstreet .................. 55/208 X |
| 3,309,844 | 3/1967 | Hemstreet et al. ........... 55/208 X |
| 3,501,897 | 3/1970 | Van Helden et al. .......... 53/73 |
| 3,707,831 | 1/1973 | Dautzenberg et al. ......... 55/483 |
| 3,747,308 | 7/1973 | Versluis et al. ............ 55/387 |
| 3,873,287 | 3/1975 | Barneby .................... 55/479 |
| 4,005,017 | 1/1977 | Kusamo et al. .............. 210/284 |
| 4,028,275 | 6/1977 | Sakai et al. ............... 252/466 |
| 4,135,895 | 1/1979 | Kraus ...................... 55/208 X |

FOREIGN PATENT DOCUMENTS

| 2211285 | 7/1974 | France . |
| 1392799 | 2/1975 | United Kingdom . |
| 1451645 | 2/1975 | United Kingdom . |

Primary Examiner—Charles Hart
Attorney, Agent, or Firm—Ronald R. Reper

[57] ABSTRACT

Apparatus for contacting a gas with solid particles comprising a housing, an inlet space, an outlet space and at least one contacting unit, where the contacting unit comprises a first wall, a second wall parallel to the first wall, a plurality of gas conduits connecting the inlet space with the outlet space, which conduits are defined between the first wall and a permeable corrugated plate attached to the first wall on the side of the second wall, and a plurality of zones filled with particles defined between the second wall, the permeable corrugated plate and separating means positioned between the second wall and the permeable corrugated plate and perpendicular to the conduits.

10 Claims, 1 Drawing Sheet

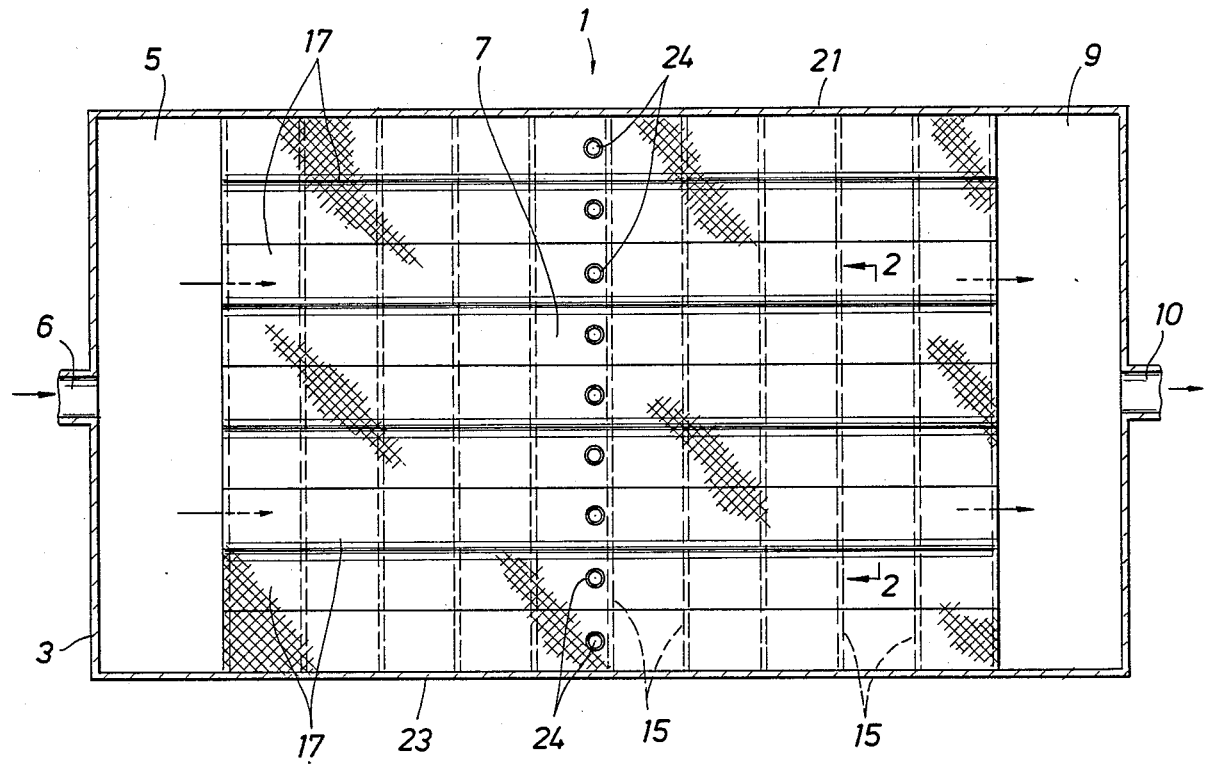
FIG.1
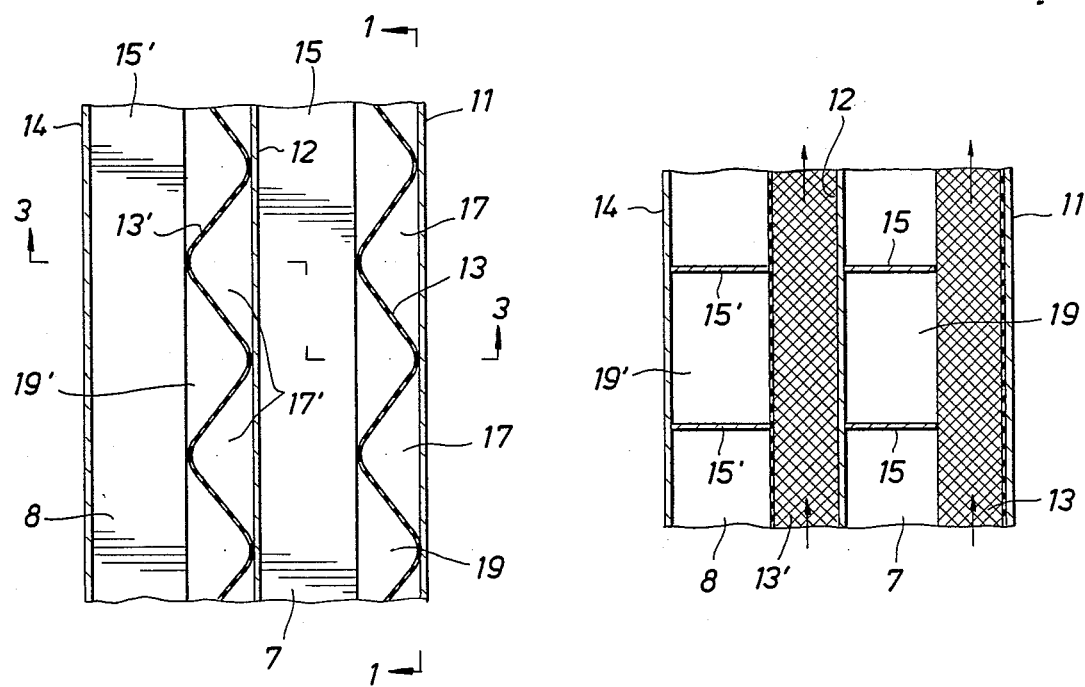
FIG.2
FIG.3

CONTACTING DEVICE FOR GAS AND SOLID PARTICLES

BACKGROUND OF THE INVENTION

The invention relates to a contacting device for gas and solid particles comprising a housing containing an inlet space, an outlet space and at least one contacting element.

A contacting device for gas and solid particles is known in which the contacting element consists of a gauze plate in the form of an S with three mutually parallel flat walls with ladder-like structures between them. The space between the first flat wall and the second flat wall is filled with solid particles, and the space between the second flat wall and the third flat wall forms a channel extending between the inlet space and the outlet space. Through this channel, during normal operation, flows the gas being treated, while through the second flat wall the gas moves between the channel and the space filled with solid particles, in which space gas comes into contact with the solid particles therein.

An object of the invention is to provide a contacting device in which, during normal operation, a larger quantity of gas can move between the channel and the space filled with solid particles.

SUMMARY OF THE INVENTION

The contacting device for gas and solid particles according to the invention thereto comprises a housing containing an inlet space, an outlet space and at least one contacting element, which contacting element comprises a first wall, a second wall parallel to the first wall, and a plurality of channels connecting the inlet space to the outlet space, which channels are defined between the first wall and a permeable corrugated sheet mounted on the side of the first wall facing the second wall, and a plurality of spacers mounted between the second wall and the permeable corrugated sheet.

BRIEF DESCRIPTION OF THE DRAWINGS

FIG. 1 shows schematically a vertical longitudinal section of the contacting device according to the invention;

FIG. 2 shows schematically section 2—2 of FIG. 1, drawn on a larger scale than that of FIG. 1; and FIG. 3 shows schematically section 3—3 of FIG. 2.

DESCRIPTION OF PREFERRED EMBODIMENTS

During normal operation, the space between the second wall and the permeable corrugated sheet is filled with solid particles. The permeable corrugated sheet increases the surface between the channels and the space filled with solid particles. This enables a larger quantity of gas to move between the channels and the space filled with solid particles than in the known contacting device.

A contacting device of this type is particularly suitable for gas treatment processes in which a low pressure drop is desirable or in which the gas being treated contains dust.

Suitable gas treatment processes for which the contacting device can be used are the removal of nitrogen oxides and/or sulphur dioxide from flue gas, the cleaning of exhaust gas from internal combustion engines or the catalytic oxidation of hydrogen sulphide.

Other processes for which the contacting device can be suitably employed are the catalytic conversion of synthesis gas, a gas mixture containing hydrogen and carbon monoxide, to liquefied hydrocarbons or alkanols such as methanol, the production of ethylene oxide, the catalytic conversion of hydrogen sulphide and sulphur dioxide to elemental sulphur according to the Claus process, or the catalytic reduction of sulphur dioxide in the presence of a reducing gas.

The invention will now, by way of example be discussed in more detail with reference to the drawings.

The contacting device 1 for gas and particles comprises a housing 3 containing an inlet space 5 with an inlet 6, a contacting element 7, a contacting element 8 (see FIGS. 2 and 3) and an outlet space 9 with an outlet 10.

The contacting element 7 comprises a first wall in the form of an impermeable separating plate 11 (see FIGS. 2 and 3), a second wall parallel to the first wall in the form of an impermeable separating plate 12, and a permeable corrugated sheet 13 mounted on the side of the first wall, separating plate 11, facing the second wall, separating plate 12. The contacting element 7 comprises a first wall in the form of an impermeable separating plate 7, a second wall, parallel to the first wall in the form of an impermeable separating plate 14, and a permeable corrugated sheet 13' mounted on the side of the first wall, separating plate 12, facing the second wall, separating plate 14. A plurality of mutually parallel channels 17 are defined between the first wall of contacting element 7, separating plate 11, and the permeable corrugated sheet 13 mounted thereupon, and a plurality of mutually parallel channels 17' are defined between the first wall of contacting element 8, separating plate 12, and the permeable corrugated sheet 13' mounted thereupon. The channels 17 and 17' connect the inlet space 5 to the outlet space 9.

The contacting element 7 further comprises a plurality of spacers in the form of parallel baffle plates 15 mounted perpendicularly to the channels 17. The baffle plates 15 are mounted between the second wall, the separating plate 12, and the tops of the permeable corrugated sheet 13. The contacting element 8 also comprises a plurality of spacers in the form of parallel baffle plates 15' mounted perpendicular to the channels 17' and between the second wall, the separating plate 14, and the tops of the permeable corrugated sheet 13'.

The housing 3 of the contacting device 1 further comprises an upper wall 21 and a lower wall 23 which can be detachably mounted.

In the contacting element 7, particle spaces 19 are defined between the separating plate 12, the permeable corrugated sheet 13 and baffle plates 15. In the contacting element 8, particle spaces 19' are defined between a separating plate 14, a permeable corrugated sheet 13' and baffle plates 15'.

The height of the spacers is large enough for the particles to be able to move through the particle spaces 19 and 19'.

During normal operation of the contacting device 1, the particle spaces 19 and 19' are filled with solid particles. These solid particles are catalyst particles for a process in which compounds in the gas mixture being treated are catalytically converted, or adsorbing particles if compounds such as sulphur dioxide are removed from the gas mixture by adsorption.

The gas mixture to be treated is introduced through inlet 6 into the inlet space 5 and flows through the channels 17 and 17' to the outlet space 9. The treated gas leaves the contacting device 1 via outlet 10.

Gas moves through the permeable corrugated sheets 13 and 13' between the channels 17 and 17' and the particle spaces 19 and 19', in which spaces the gas comes into contact with the solid particles present therein. The treatment of the gas takes place in the particle spaces 19 and 19'.

The permeable corrugated sheets 13 and 13' give the channels 17 and 17' a large surface through which gas can move between the channels 17 and 17' and the particle spaces 19 and 19'

The cross sectional area of a channel is suitably between 0.1 and 5 cm². For a dirty gas containing many particles, for example, soot, a suitable surface area is between 2 and 5 cm², while for a cleaner gas the surface area is less than 2 cm².

The number of channels is preferably chosen such that the gas velocity in the channels is between 1 and 100 m/s. Very suitable velocities are between 3 and 20 m/s, at which velocities no particles will be deposited on the walls of the channels 17 and 17'.

In a suitable embodiment of a contacting element, the distance between the first wall and the second wall is between 1.1 and 5 times the corrugation height of the permeable corrugated sheet.

The drawings show a contacting device with two contacting elements. Depending on the application, the contacting device may be provided with one contacting element or more than two contacting elements.

FIG. 1 shows a contacting device in which the angle between the baffle plates 15 and the channels 17 is 90°. This angle suitably lies between 60° and 120°. If the angle between the channels through which the gas being treated flows and the baffle plates is chosen such that some spaces filled with particles extend from the inlet space to the outlet space, a part of these spaces can be kept empty so that gas can flow through them, too.

The contacting device shown in FIGS. 2 and 3 comprises contacting elements in which the baffle plates are mounted between the second wall and the tops of the permeable corrugated sheet. In an alternative embodiment the baffle plates can also extend to the valleys of the permeable corrugated sheets.

Separating plates 12 and baffle plates 15 and 15' can be permeably constructed so that the gas mixture that can flow through the channels 17 and 17' can also move through the separating plates 12 and the baffle plates 15 and 15'.

Permeable corrugated sheets, permeable separating plates and permeable baffle plates can be made of any suitable material, for example, ceramic fibres, natural fibres, synthetic fibres, glass fibre or metal gauze whose mesh size is smaller than the size of the solid particles. If the separating plates 12 are made of non-rigid material, such as metal gauze, reinforcing means must be attached such that the contacting elements 7 and 8 are sufficiently strong and stiff.

The particle spaces 19 and 19' may be filled by, after detaching the upper wall 21, introducing solid particles into the particle spaces 19 and 19'. After filling, the upper wall 21 is replaced. After use, the solid particles are removed from the particle spaces 19 and 19' by detaching the lower wall 23.

If the spacers are perpendicular to the channels, the space to be filled with solid particles can be filled with solid particles in a direction perpendicular to the direction in which the gas flows through the channels. That is why the contacting device according to the invention is suitable for replacing the solid particles either intermittently or continuously, without having to shut down the contacting device.

By replacing the upper wall 21 by a particle feed device (not shown) and the lower wall 23 by a particle discharge device (not shown), the solid particles can be fed continuously or intermittently through the particle spaces 19 and 19'. In order to renew the solid particles during normal operation, new solid particles can be added either intermittently or continuously and used solid particles discharged.

FIG. 2 shows an embodiment of the invention in which the corrugated sheets 13 and 13' have an undulatory section, but the section can also be triangular, semicircular or trapezoidal.

If components of the gas react endothermically or exothermically during the contact with the solid particles, the contacting device can be provided with means for adding or removing heat, located in the particle spaces. In a suitable embodiment, these means comprise channels or tubes 24 mounted on the side of the second wall facing the first wall. For purposes of clarity only a single row of means for adding or removing heat is shown in a single particle space; however, said means may be positioned in a plurality of particle spaces. During normal operation, a suitable heat transport medium, such as steam or water, flows through these tubes.

What is claimed is:

1. Contacting device for gas and solid particles comprising a housing containing an inlet space, an outlet space and at least one contacting element, which contacting element comprises a first wall, a second wall parallel to the first wall, and a plurality of channels connecting the inlet space to the outlet space, which channels are defined between the first wall and a permeable corrugated sheet mounted on the side of the first wall facing the second wall, and a plurality of spacers mounted between the second wall and the permeable corrugated sheet.

2. Contacting device as in claim 1, characterized in that the cross-sectional area of a channel is between 0.1 and 5 cm².

3. Contacting device as in claim 2, characterized in that the cross-sectional area of a channel is less than 2 cm².

4. Contacting device as in claim 3, characterized in that the corrugations of the permeable corrugated sheet are triangular, semicircular or trapezoidal.

5. Contacting device as in claim 1 characterized in that said spacers comprise a plurality of parallel baffle plates mounted at an angle to the channels.

6. Contacting device as in claim 5, characterized in that the angle of a baffle plate to the channels lies between 60° and 120°.

7. Contacting device as in claim 6, characterized in that the angle of a baffle plate to the channels is 90°.

8. Contacting device as in claim 1, characterized in that a contacting element is provided with a permeable wall.

9. Contacting device as in claim 1, characterized in that the distance between said first wall and said second wall lies between 1.1 and 5 times the corrugation height of the permeable corrugated sheet.

10. Contacting device as in claim 1, characterized in that a contacting element is provided with means for adding or removing heat.

* * * * *